United States Patent
Nakata et al.

(10) Patent No.: US 6,815,503 B2
(45) Date of Patent: Nov. 9, 2004

(54) POLYPROPYLENE RESIN COMPOSITION AND GAS PERMEABLE FILM USING THE SAME

(75) Inventors: Shinji Nakata, Ichihara (JP); Yasuhiro Shiraishi, Ichihara (JP); Takanori Nakashima, Ichihara (JP); Shinichi Akitaya, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 10/104,303

(22) Filed: Mar. 20, 2002

(65) Prior Publication Data

US 2002/0193527 A1 Dec. 19, 2002

(30) Foreign Application Priority Data

Apr. 3, 2001 (JP) ........................ 2001-104626

(51) Int. Cl.[7] ............... C08J 5/18; C08J 23/10; C08L 23/00; C08L 23/04
(52) U.S. Cl. ...................... 525/191; 525/240
(58) Field of Search .................. 525/191, 240

(56) References Cited

U.S. PATENT DOCUMENTS

| | | | |
|---|---|---|---|
| 4,820,775 A | 4/1989 | Shiga et al. | |
| 5,990,242 A | 11/1999 | Naga et al. | |
| 6,191,219 B1 | * 2/2001 | Tanaka et al. | 525/95 |
| 6,242,535 B1 | * 6/2001 | Kagami et al. | 525/191 |
| 6,355,736 B1 | * 3/2002 | Nakashima et al. | 525/323 |

FOREIGN PATENT DOCUMENTS

| | | |
|---|---|---|
| EP | 0863183 A1 | 11/1996 |
| EP | 0987290 A1 | 4/1999 |
| JP | 01-225648 | 8/1989 |
| JP | 04-202409 | 7/1992 |
| JP | 2001-123038 | 8/2001 |

* cited by examiner

Primary Examiner—Nathan M. Nutter
(74) Attorney, Agent, or Firm—J.C. Patents

(57) ABSTRACT

Provided are a novel polypropylene resin composition, a gas permeable film comprising the same and provided with satisfactory optical characteristics (transparency, gloss and see throughness) as well as an excellent gas permeability (water vapor, oxygen and ethylene gas) without damaging a rigidity and a vegetable and fruit freshness long term-maintaining method using the above gas permeable film for a wrapping film.

Figure 1:
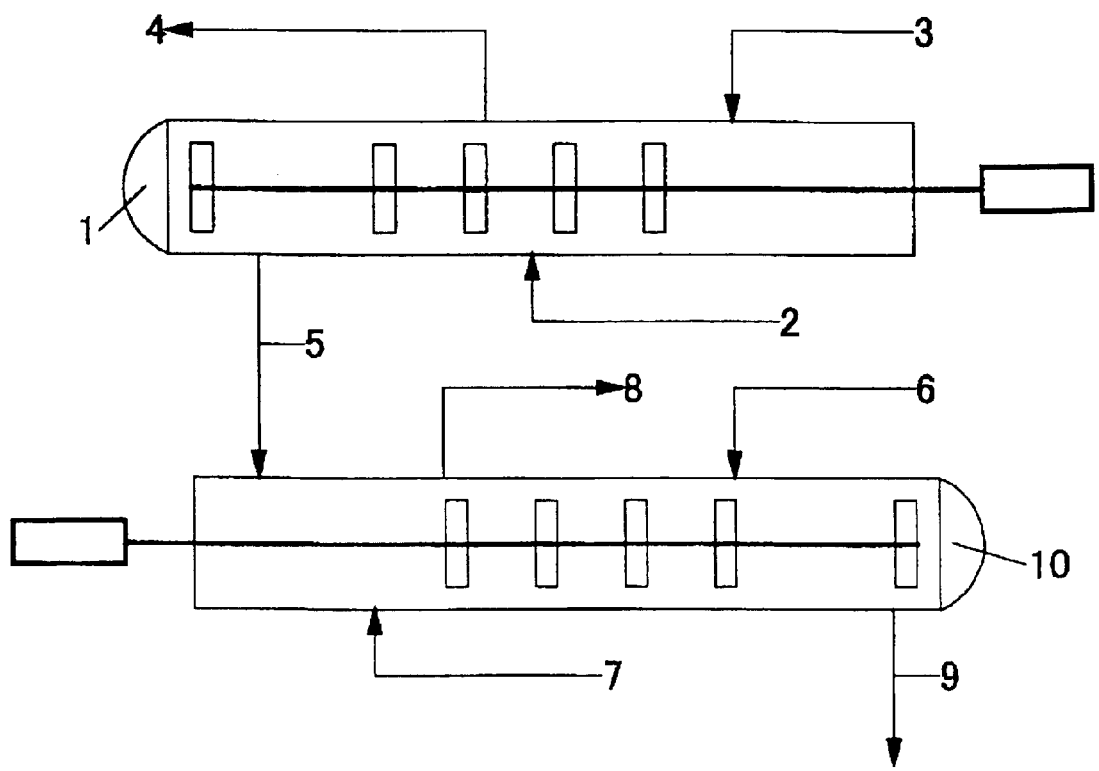

The polypropylene resin composition described above comprises 40 to 95% by weight of a propylene polymer (A) and 5 to 60% by weight of an ethylene/propylene/butene random copolymer (B) having a butene content of 3 to 40% by weight and an ethylene content of 10 to 30% by weight, wherein a ratio ($\eta_B/\eta_A$) of an intrinsic viscosity $\eta_B$ of the component (B) described above to an intrinsic viscosity $\eta_A$ of the component (A) described above falls in a range of 0.5 to 1.3; and the $\eta_B$ described above falls in a range of 0.5 to 3.0 dl/g. The gas permeable film described above is a single layer or multilayer film comprising at least one layer of a film of the polypropylene resin composition described above and having a thickness of 10 to 100 μm, and it has the following characteristics:

(1) a permeability $T_{H2O}$ of water vapor is 9 to 50 g/m²·24 h (based on JIS Z 0208),
(2) a permeability $T_{O2}$ of oxygen is 600 to 12500 nmol/m²·s·100 kPa (based on JIS K 7126-A) and
(3) a permeability $T_{ethylene}$ of ethylene gas is 600 to 22500 nmol/m²·s·100 kPa (based on JIS K 7126-A).

2 Claims, 1 Drawing Sheet

POLYPROPYLENE RESIN COMPOSITION AND GAS PERMEABLE FILM USING THE SAME

CROSS-REFERENCE TO RELATED APPLICATION

This application claims the priority benefit of Japanese application serial No. 2001-104626, filed Apr. 3, 2001.

BACKGROUND OF THE INVENTION

1. Field of the Invention

The present invention relates to a novel polypropylene resin composition, a gas permeable film comprising the same and provided with satisfactory optical characteristics (transparency, gloss and see throughness) as well as an excellent gas permeability (water vapor, oxygen and ethylene gas) without damaging a rigidity and a method for maintaining a freshness of vegetables and fruits over a long period of time using the above gas permeable film for a wrapping film.

2. Description of the Related Art

A polypropylene film has a rigidity and excellent optical characteristics (transparency, gloss and the like) which are required to packaging materials and therefore has widely been used. However, when a polypropylene film is used as a wrapping material for vegetables and fruits, it does not have a satisfactory gas permeability against water vapor, oxygen and ethylene gas, and therefore it has been used making holes for permeating gas. In this case, ethylene gas generated from vegetables and fruits which are wrapped matters can sufficiently be discharged, and oxygen necessary for breathing of vegetables and fruits can sufficiently be taken in. However, water vapor can not be prevented from vaporizing from vegetables and fruits, so that there has been the problem that vegetables and fruits are liable to be dried and freshness thereof is lost.

Known is a film which shows a gas permeability without carrying out such drilling work and can maintain a freshness of vegetables and fruits (International Publication WO99/51665), but there has been the problem that the film does not have satisfactory transparency, gloss and see throughness (hereinafter referred to as [optical characteristics]) which are required in an actual distribution route.

SUMMARY OF THE INVENTION

An object of the present invention is to provide a resin composition capable of preparing a gas permeable film which is endowed with satisfactory optical characteristics as well as an excellent gas permeability (water vapor, oxygen and ethylene gas) without damaging a rigidity and a method for maintaining a freshness of vegetables and fruits over a long period of time by using the above gas permeable film for a wrapping film.

Intensive researches repeated by the present inventors in order to achieve the object described above have resulted in finding that a film produced from a polypropylene resin composition comprising a propylene polymer (A) and an ethylene/propylene/butene random copolymer (B) containing the specific amounts of butene and ethylene has an excellent gas permeability (water vapor, oxygen and ethylene gas) without damaging a rigidity and is endowed with satisfactory optical characteristics in combination therewith. Thus, they have come to complete the present invention.

That is, the polypropylene resin composition according to the present invention is characterized by comprising a propylene polymer as a component (A) and an ethylene/propylene/butene random copolymer as a component (B). More specifically, it is characterized by comprising 40 to 95% by weight of a propylene polymer as the component (A) and 5 to 60% by weight of an ethylene/propylene/butene random copolymer having a butene content of 3 to 40% by weight and an ethylene content of 10 to 30% by weight as the component (B).

Further, the polypropylene resin composition according to the present invention is characterized by that a ratio $\eta_B/\eta_A$ of an intrinsic viscosity $\eta_B$ of the component (B) described above to an intrinsic viscosity $\eta_A$ of the component (A) described above falls in a range of 0.5 to 1.3. Also, the polypropylene resin composition according to the present invention is characterized by that the component (B) described above has an intrinsic viscosity $\eta_B$ falling in a range of 0.5 to 3.0 dl/g.

Further, the gas permeable film according to the present invention is characterized by that it is a single layer or multilayer film comprising at least one layer of a film of the polypropylene resin composition described above according to the present invention and having a thickness of 10 to 100 μm and that it has the following characteristics:

(1) a permeability $T_{H2O}$ of water vapor is 9 to 50 g/m²·24 h (based on JIS Z 0208), (2) a permeability $T_{O2}$ of oxygen is 600 to 12500 nmol/m²·s·100 kPa (based on JIS K 7126-A) and (3) a permeability $T_{ethylene}$ of ethylene gas is 600 to 22500 nmol/m²·s·100 kPa (based on JIS K 7126-A).

Further, the gas permeable film according to the present invention is characterized by that the film described above is oriented at least in a monoaxial direction and includes a film oriented at an orienting magnification of 3 to 60 times at least in a monoaxial direction.

The vegetable and fruit freshness long term-maintaining method according to the present invention is characterized by using the gas permeable film according to the present invention as a film for wrapping vegetables and fruits.

BRIEF DESCRIPTIONS OF THE DRAWINGS

Shown is a flow sheet of a continuous polymerization apparatus used in the examples and the comparative examples.

DETAILED DESCRIPTION OF THE PREFERRED EMBODIMENTS

Polypropylene Resin Composition

The polypropylene resin composition of the present invention is characterized by containing a propylene homopolymer as the component (A). The propylene homopolymer contained therein makes it possible to maintain a rigidity of the resulting gas permeable film.

In this respect, the propylene homopolymer which is the component (A) shall not specifically be restricted, and the isotactic pentad ratio (P) is preferably 0.90 or more, more preferably 0.92 or more in terms of the rigidity. If the (P) is less than 0.90, the rigidity is reduced. The intrinsic viscosity $\eta_A$ is preferably 0.5 to 4.0 dl/g, more preferably 1.0 to 4.0 dl/g in terms of the transparency. If the $\eta_A$ is large, the resulting gas permeable film is reduced in a transparency, and if the $\eta_A$ is small, the film is reduced in a moldability.

Commercial products can be used for the component (A), but it can readily be obtained usually by publicly known production processes. Any processes may be used as long as the characteristics described above are provided, and it can readily be obtained usually by publicly known production processes.

Also, the polypropylene resin composition of the present invention is characterized by comprising an ethylene/propylene/butene random copolymer as the component (B). Further, the component (B) is characterized by having an ethylene content of 10 to 30% by weight and a butene content of 3 to 40% by weight. If the component (B) has a too small ethylene content, the resulting gas permeable film tends to be reduced in a gas permeating amount. On the other hand, if it has a larger content thereof, the film tends to be reduced in a transparency and a see throughness. If the component (B) has a smaller butene content, the resulting gas permeable film tends to be reduced in a see throughness. On the other hand, if it has a larger content thereof, the copolymer obtained tends to be notably deteriorated in a powder property and to be difficult to produce.

Further, the polypropylene resin composition of the present invention is characterized by comprising 40 to 95% by weight of the component (A) and 5 to 60% by weight of the component (B), more preferably 50 to 90% by weight of the component (A) and 10 to 50% by weight of the component (B). If the propylene polymer (A) has a small content, the resulting gas permeable film tends to be notably reduced in a rigidity, and as a result thereof, it is not satisfactory as a packaging material for a heavy wrapped matter. On the other hand, if it has a large content, the resulting gas permeable film tends to be reduced in a gas permeability.

Further, the polypropylene resin composition according to the present invention has a ratio $\eta_B/\eta_A$ of an intrinsic viscosity $\eta_B$ of the component (B) to an intrinsic viscosity $\eta_A$ of the component (A) falling preferably in a range of 0.5 to 1.3. If the intrinsic viscosity ratio $\eta_B/\eta_A$ is larger than this range, the resulting gas permeable film tends to be reduced in a transparency and a see throughness to a large extent. On the other hand, if the intrinsic viscosity ratio $\eta_B/\eta_A$ is smaller than this range, the resulting gas permeable film tends to be reduced in a rigidity.

Further, in the polypropylene resin composition according to the present invention, the component (B) has an intrinsic viscosity n B falling in a range of preferably 0.5 to 3.0 dl/g, more preferably 1.0 to 3.0 dl/g and particularly preferably 1.3 to 2.8 dl/g. If the intrinsic viscosity ratio $\eta_B$ is larger than this range, the resulting gas permeable film is not satisfactory in a transparency and a see throughness. On the other hand, if the intrinsic viscosity ratio $\eta_B$ is smaller than the above range, the resulting gas permeable film tends to be reduced in a rigidity.

Further, the polypropylene resin composition in the present invention has an intrinsic viscosity $\eta_{WHOLE}$ falling in a range of preferably 1.0 to 3.6 dl/g, more preferably 1.3 to 3.0 dl/g.

Gas Permeable Film

The gas permeable film according to the present invention is characterized by that it is a single layer or multilayer film comprising at least one layer of a film produced from the polypropylene resin composition according to the present invention and having a thickness of 10 to 100 μm. The thickness controlled to 10 to 100 μm elevates a moldability and a workability (packaging property) of the film. If the thickness is smaller than 10 μm, it tends to be difficult to produce the film having an even thickness. On the other hand, if it is larger than 100 μm, the satisfactory gas permeating amount is not obtained.

Further, as the gas permeable film according to the present invention is produced from the polypropylene resin composition according to the present invention, it is characterized by having the following characteristics altogether. That is, (1) a permeability $T_{H2O}$ of water vapor is 9 to 50 g/m$^2$·24 h (based on JIS Z 0208), (2) a permeability $T_{O2}$ of oxygen is 600 to 12500 nmol/m$^2$·s·100 kPa (based on JIS K 7126-A) and (3) a permeability $T_{ethylene}$ of ethylene gas is 600 to 22500 nmol/m$^2$·s·100 kPa (based on JIS K 7126-A).

In respect to the gas permeability, when water vapor has a permeability $T_{H2O}$ of 9 to 50 g/m$^2$·24 Hr, the gas permeable film suited for wrapping vegetables and fruits is obtained. If water vapor has a permeability of smaller than 9 g/m$^2$·24 Hr, humidity contained in the wrapping is excessive, and putrefaction is liable to be accelerated. On the other hand, if it is larger than 50 g/m$^2$·24 Hr, the vegetables and fruits, particularly the vegetables are liable to be dried and withered. A permeability of water vapor falls in a range of preferably 10 to 45 g/m$^2$·24 Hr. Further, when oxygen has a permeability $T_{O2}$ of 600 to 12500 nmol/m$^2$·s·100 kPa, the gas permeable film suited for wrapping vegetables and fruits is obtained. If oxygen has a permeability of smaller than 600 nmol/m$^2$·s·100 kPa, the wrapped vegetables and fruits are extremely reduced in a breathing amount and liable to lose freshness. On the other hand, if it is larger than 12500 nmol/m$^2$·s·100 kPa, the vegetables and fruits are increased in a breathing amount and advanced in deterioration caused by a metabolism of the vegetables and fruits themselves. Accordingly, both are not preferred. Oxygen has a permeability falling in a range of 600 to 12500 nmol/m$^2$·s·100 kPa, preferably 1000 to 9000 nmol/m$^2$·s·100 kPa. When ethylene gas has a permeability $T_{ethylene}$ of 600 to 22500 nmol/m$^2$·s·100 kPa, the gas permeable film suited for wrapping vegetables and fruits is obtained. If ethylene gas has a permeability of smaller than 600 nmol/m$^2$·s·100 kPa, the vegetables and fruits are liable to be accelerated in additional ripening and putrefaction, and it is larger than 22500 nmol/m$^2$·s·100 kPa, a too large permeability of water vapor follows. Ethylene gas has a permeability falling in a range of 600 to 22500 nmol/m$^2$·s·100 kPa, preferably 600 to 15000 nmol/m$^2$·s·100 kPa and more preferably 600 to 9000 nmol/m$^2$·s·100 kPa.

When the gas permeable film of the present invention is a multilayer film, any one of film layers comprising olefin resins such as propylene homopolymers, propylene/ethylene copolymers, propylene/α-olefin copolymers, propylene/ethylene/α-olefin copolymers, propylene/ethylene/α-olefin copolymers, propylene/ethylene block copolymers, propylene/α-olefin block copolymers, ethylene/α-olefin copolymers, ethylene homopolymers and ethylene-vinyl acetate copolymers may be used as the other film layer constituting the above multilayer film together with the film comprising the polypropylene resin composition of the present invention as long as the conditions of the gas permeability described above are satisfied. Preferred is a film layer comprising a main component of a propylene homopolymer, a propylene/ethylene copolymer, a propylene/α-olefin copolymer, a propylene/ethylene/α-olefin copolymer, an ethylene/α-olefin copolymer or an ethylene homopolymer.

Further, the gas permeable film according to the present invention is, as explained above, excellent in a transparency and particularly a see throughness which are optical characteristics, and it has an excellent film strength and fuse sealing property even in a single layer structure. Further, controlling of a content of the component (B) and a thickness of the film makes it possible to control a permeability of gas and provides the polypropylene film for wrapping vegetables and fruits with very suited performances.

Further, the gas permeable film according to the present invention is characterized by that the film described above is oriented at least in a monoaxial direction and includes a film oriented at an orienting magnification of 3 to 60 times at least in a monoaxial direction.

Production Process for Polypropylene Resin Composition

The polypropylene resin composition of the present invention may be produced by any process as long as the composition satisfying various conditions described above can be produced, and it can suitably be produced by using a two stage continuous polymerization process in a gas phase.

This two stage continuous polymerization process comprises a first polymerization step in which propylene is polymerized in a gas phase in the presence of an olefin polymerization catalyst component having an average particle diameter of 30 to 300 μm to produce a prescribed amount of the propylene polymer (A) and a second polymerization step in which propylene, ethylene and butene are copolymerized to produce a balance of the ethylene/propylene/butene copolymer (B), and these steps are continuously carried out in order. The olefin polymerization catalyst component used in the production process described above shall not specifically be restricted, and publicly known olefin polymerization catalysts such as titanium base or metallocene base catalysts can be used for the production. Among them, the titanium base catalysts are sited in terms of a cost Used is the olefin polymerization catalyst component having an average particle diameter of 30 to 300 μm, preferably 30 to 150 μm. If the olefin polymerization catalyst component has a too small average particle diameter, the flowability of the powder of the resultant polypropylene resin composition is remarkably lost, and the polymerization system is contaminated by adhesion thereof onto the wall of the polymerizing equipment and the stirring blades or it is difficult to transport the powder discharged from the polymerizing equipment Thus, the stable production is disturbed to a large extent.

A stereospecific catalyst prepared by combining the olefin polymerization catalyst component described above, an organic aluminum compound and, if necessary, an organic silicon compound is used for polymerizing propylene in the first polymerization step. Preferably used is the olefin polymerization catalyst component which is subjected to pre-activation treatment by reacting a small amount of α-olefin in advance therewith.

The pre-activation treatment of the olefin polymerization catalyst component can be carried out in the presence or absence of the same organic aluminum compound as used in the present polymerization. An addition amount of the organic aluminum compound used is varied depending on the kind of the olefin polymerization catalyst component used, and when transition metal contained in the olefin polymerization catalyst component is titanium, the organic aluminum compound is usually used in a range of 0.1 to 40 moles, preferably 0.3 to 20 moles per mole of a titanium atom and reacted with α-olefin of 0.1 to 100 g, preferably 0.5 to 50 g per g of the olefin polymerization catalyst component at 10 to 80° C. in 10 minutes to 48 hours in an inert solvent.

In the pre-activation treatment, the same organic silicon compound as used in the present polymerization may be used, if necessary, in a range of 0.01 to 10 moles per mole of the organic aluminum compound.

The α-olefin used in the pre-activation treatment of the olefin polymerization catalyst component includes ethylene, propylene, 1-butene, 1-pentene, 1-hexene, 1-octene, 1-decene, 1-tetradecene, 1-hexadecene, 1-octadecene, 1-eicocene, 4-methyl-1-pentene and 3-methyl-1-pentene. They may be used alone or in a mixture with two or more kinds of the other α-olefins. Further, in the polymerization, a molecular weight controller such as hydrogen can be used in combination therewith in order to control a molecular weight of the resulting polymer.

The inert solvent used in the pre-activation treatment of the olefin polymerization catalyst component includes inert solvents exerting no marked effects on the polymerization reaction, such as saturated hydrocarbons including hexane, heptane, octane, decane, dodecane and liquid paraffin and silicon oils having a structure of dimethylpolysiloxane. These inert solvents may be either a single solvent of one kind thereof or a mixed solvent of two or more kinds thereof.

In using these inert solvents, they are preferably used after removing impurities such as moisture, sulfur compounds and the like which exert adverse effects on the polymerization.

In the production process for the polypropylene resin composition used in the present invention, continuously carried out are the first polymerization step in which propylene is polymerized in a gas phase in the presence of the olefin polymerization catalyst component subjected to the pre-activation treatment by the method described above and then the second polymerization step in which propylene is copolymerized with ethylene and butene.

The first polymerization step shall not be restricted to gas phase polymerization, and slurry polymerization and bulk polymerization can be employed. However, the second polymerization step subsequent thereto is preferably gas phase polymerization, and therefore gas phase polymerization is preferably adopted as well in the first polymerization step. If slurry polymerization or bulk polymerization is employed for the second polymerization step, the copolymer is dissolved in a solvent, so that it is liable to become difficult to continue stable operation.

In respect to the polymerization conditions of the propylene polymer (A), propylene is fed and polymerized under the conditions of a polymerization temperature of 20 to 120° C., preferably 40 to 100° C. and a polymerization pressure of an atmospheric pressure to 9.9 MPa, preferably 0.59 to 5.0 MPa in the presence of the stereospecific catalyst comprising the olefin polymerization catalyst component, the organic aluminum compound and, if necessary, the organic silicon compound while mixing and stirring a fixed amount of the powder to obtain the propylene polymer (A). A use proportion (molar ratio) of the organic aluminum compound to the olefin polymerization catalyst component is varied depending on the kind of the olefin polymerization catalyst component used, and when a titanium base catalyst component is used, Al/Ti is 1 to 500, preferably 10 to 300. In this case, a mole number of the titanium base catalyst component means a substantial Ti gram atomic number present in the titanium base catalyst component.

A use proportion (molar ratio) of the organic aluminum compound used to the organic silicon compound used if necessary is varied depending on the kind of the olefin polymerization catalyst component used, and in the case of a titanium base catalyst component, Al/Si is 1 to 20.

The propylene polymer (A) is produced so that 40 to 95% by weight of the propylene polymer (A) is contained in the composition finally obtained. A molecular weight controller such as hydrogen can be used in the polymerization for controlling an intrinsic viscosity $\eta_A$ of the component (A). After producing the component (A), a part of the resulting powder is drawn out and used for determining the intrinsic viscosity $\eta_A$ and the polymer yield based on the catalyst unit weight.

Subsequently to the polymerization of the component (A) in the first polymerization step, carried out is the second polymerization step in which a mixed monomer of propylene, ethylene and butene is copolymerized under the conditions of a polymerization temperature of 20 to 120° C., preferably 40 to 100° C. and a polymerization pressure of an atmospheric pressure to 9.9 MPa, preferably 0.59 to 5.0 MPa to produce the propylene/ethylene/butene random copolymer (B). An ethylene polymer unit content and a butene polymer unit content in the propylene/ethylene/butene random copolymer (B) are controlled so that the ethylene polymer unit content in the copolymer is controlled to 10 to 30% by weight and the butene polymer unit content is controlled to 3 to 40% by weight by controlling a molar ratio of ethylene to propylene and a molar ratio of butene to propylene in the mixed monomer gas.

On the other hand, in respect to a weight percentage of the propylene/ethylene/butene random copolymer (B) to the propylene polymer (A), a weight percentage of the propylene/ethylene/butene random copolymer (B) contained in the composition finally obtained is controlled to 5 to 60% by weight by controlling the polymerization time and using a polymerization activity controller for catalyst such as carbon monoxide and hydrogen sulfide. Further, a molecular weight of the propylene/ethylene/butene random copolymer (B) is controlled by adding a molecular weight controller such as hydrogen in the polymerization of the propylene/ethylene/butene random copolymer (B) so that an intrinsic viscosity n B of the propylene/ethylene/butene random copolymer (B) is controlled preferably to 0.5 to 3.0 dl/g.

When the intrinsic viscosity $\eta_B$ of the propylene/ethylene/butene random copolymer (B) can not directly be measured, it is determined from an intrinsic viscosity $\eta_A$ of the propylene polymer (A), an intrinsic viscosity $\eta_{WHOLE}$ of the propylene resin composition which is the final product and a weight % $W_B$ of the ethylene/propylene/butene random copolymer (B) according to the following equation:

$$\eta_B = \{\eta_{WHOLE} - (1 - W_B/100)\eta_A\}/(W_B/100)$$

Any of a batch method, a semi-continuous polymerization method and a continuous polymerization method can be employed for the polymerization method, and the continuous polymerization method is preferred from an industrial point of view.

After finishing the second polymerization step, the monomers can be removed from the polymerization system to obtain a particulate polymer. The polymer thus obtained is measured for an intrinsic viscosity $\eta_{WHOLE}$, ethylene and butene contents and a polymer yield based on a catalyst unit weight.

Production Process for Gas Permeable Film

The polypropylene resin composition used in the present invention can be blended with publicly known additives such as antioxidants, anti-blocking agents, anti-fogging agents, surfactants, anti-bacterial agents and molecular weight-reducing agents as long as the effects of the present invention are not damaged. A method for blending the polypropylene resin composition with the additives described above shall not specifically be restricted as long as it is a method in which they can evenly be blended, and preferred is, for example, a method in which they are mixed by means of a ribbon blender or a Henschel mixer and in which the mixture is molten, kneaded and extruded by means of an extruding machine.

The gas permeable film of the present invention is an oriented film prepared by orienting a non-oriented film obtained by molding the polypropylene resin composition by a conventional T die method or inflation method or a sheet molded by these methods in a monoaxial or diaxial direction. Capable of being given as the orienting method are, for example, a monoaxial orienting method making use of a hot roll and a hot plate, a serial diaxial orienting method and a simultaneous diaxial orienting method by a tenter method and a simultaneous diaxial orienting method by a tubular method.

In the case of the oriented film, the orienting magnification is preferably 3 to 60 times in order to maintain a transparency, a strength and a gas-permeating amount of the gas permeable film. If the orienting magnification is smaller than 3 times, a thickness of the gas permeable film is liable to be uneven, and the appearance is deteriorated. On the other hand, if the orienting magnification exceeds 60 times, orienting becomes difficult. The orienting magnification is preferably 10 to 60 times, more preferably 20 to 50 times.

When the gas permeable film of the present invention is a multilayer film, the production process thereof shall not specifically be restricted, and a multilayer extrusion molding method, a dry laminate method and an extrusion laminate method can be given as the example thereof.

Vegetable and Fruit Freshness Long Term-maintaining Method

The vegetable and fruit freshness long term-maintaining method in the present invention is characterized by using the gas permeable film according to the present invention as a film for wrapping vegetables and fruits. Accordingly, the gas permeable film explained above according to the present invention endowed with excellent gas permeability and optical characteristics in combination can maintain a freshness of vegetables and fruits wrapped therewith over a long period of time.

In this respect, [vegetables and fruits] include vegetables, edible roots, fruits, ornamental plants and mushrooms. The following ones can be given as the examples of vegetables and fruits which are suited for wrapping with the gas permeable film of the present invention.

Included are artichokes, fine leek adzuki beans, asparagus, avocado, aloe, apricot, strawberry, fig, orange (iyokan), udo, Japanese apricot, shallot, green soybeans, enoki mushroom, okra, olive, orange, white radish sprouts, persimmon, turnip, pumpkin, cauliflower, kiwi, chrysanthemum, Judas's-ear, cabbage, cucumber, kumquat, ginkgo nut, chestnut, green peas, walnut, grapefruit, watercress, gogyo spring herb, cowberry, burdock, a kind of Chinese cabbage, coriander, cherry, pomegranate, sweet potato, taro, shaddock, string bean, lettuce, shiitake mushroom, labiate, shimeji mushroom, potato, coriander, corn marigold, ginger, watermelon, sweetie (Japanese orange), star fruit (Japanese orange), zucchini, plum, parsley, celery, royal fem, broad bean, Chinese cabbage, Japanese radish, soybean, red pepper, bamboo shoot, onion, Japanese angelica sprout, Chinese green cabbage, field horsetail, dekopon (Japanese orange), Chinese watermelon, com, tomato, durian, truffe, yam, leek, egg plant, nazuna-spring herb, summer orange, rape blossoms, nameko mushroom, squash, Japanese pear, leek, carrot, garlic, pineapple, Chinese cabbage, chickweed, parsley, hassaku Japanese orange, banana, papaya, (banpeiyu) Japanese big orange, green pepper, loquat (Japanese medlar), butterbur, butterbur scape, fukrotake mushroom, grape, plum, blueberry, prune, broccoli, spinach, hotokenoza spring herb, ponkan Japanese orange, maitake mushroom, muscat, mushroom, matsutake mushroom, mango, mangosteen, mandarin orange, honewort, Japanese ginger, melon, peach, beansprout, mulukhiya, Japanese yam, citron, Western pear, mugwort, litchi, raspberry, radish, apple, lettuce, lemon, lotus root, Welsh onion (chiboul) and Japanese horseradish (wasabi).

Use of a vegetable and fruit wrapping material comprising an impact-cushioning member (for example, foamed styrol trays, foamed propylene trays and the like) and the gas permeable film of the present invention makes it possible not only to obtain a freshness-maintaining effect by virtue of the characteristics of the gas permeable film of the present invention but also protect the vegetables and fruits from impact, which results in making it possible to prevent the vegetables and fruits from being damaged and maintain a freshness thereof over a longer time of period. For example, when a peach is wrapped with a vegetable and fruit wrapping material prepared by combining the gas permeable film of the present invention with a foamed styrol-made pan, the peach is protected from impact by the foamed styrol-made pan and less liable to be damaged. Further, the partial presence of the gas permeable film of the present invention allows a freshness-maintaining effect to be exhibited by virtue of the gas permeability thereof, and further provided as well is the effect that the excellent see throughness and transparency thereof make it easy to visually confirm the state of the peach which is a wrapped article.

EXAMPLES

The present invention shall more specifically be explained below with reference to examples and comparative examples. Physical properties shown in the examples and the comparative examples were measured by the following methods and evaluated based on the following criteria.

Polypropylene Resin Composition

1) Various Physical Property Measuring Methods a) Intrinsic viscosity (dl/g): tetralin was used as a solvent to determine the intrinsic viscosity under the condition of a temperature of 135° C. by means of an automatic viscosity measuring device (Model AVS2, manufactured by Mitsui Toatsu Chemical Co., Ltd.).

b) Ethylene and butene polymer unit contents: measured by an infrared absorption spectral method.

2) Preparation of Olefin Polymerization Catalyst

A glass flask replaced with nitrogen was charged with 60 ml of titanium tetrachloride and 40 ml of toluene to prepare a mixed solution. Then, a suspension prepared by mixing 20 g of diethoxymagnesium having an average particle diameter of 42 $\mu$m, 100 ml of toluene and 7.2 ml of di-n-butyl phthalate was added to the mixed solution described above which was maintained at a temperature of 10° C. Then, the temperature was elevated from 10° C. up to 90° C. in 80 minutes, and the reaction was carried out for 2 hours while stirring. After finishing the reaction, the resulting solid product was washed four times with each 200 ml of toluene of 90° C., and 60 ml of titanium tetrachloride and 140 ml of toluene were added again. The temperature was elevated to 112° C. to carry out the reaction for 2 hours while stirring. After finishing the reaction, the reaction product was washed ten tines with 200 ml of n-heptane of 40° C. to obtain an olefin polymerization catalyst: A-1. The olefin polymerization catalyst: A-1 thus obtained had an average particle diameter of 42 $\mu$m and a composition of Mg: 18.9% by weight, Ti: 2.2% by weight and Cl: 61.6% by weight 3) Pre-Activation Treatment of Olefin Polymerization Catalyst Component A stainless steel-made reactor equipped with an inclined blade having a content volume of 20 liters was replaced with nitrogen and then charged with 17.7 liters of hexane, 100.6 mmol of triethylaluminum, 15.1 mmol of diisopropyldimethoxysilane and 120.4 g of the olefin polymerization catalyst (A-1) prepared above at a room temperature, and then it was heated up to 30° C. Next, 240.8 g of propylene was fed in 3 hours while stirring to carry out pre-activation treatment. The result of analysis showed that 1.9 g of propylene per g of the olefin polymerization catalyst component was reacted.

4) First Polymerization Step

In a flow sheet shown in FIG. 1, a horizontal type polymerizing device (L/D=6, content volume: 100 liters) equipped with stirring blades was continuously fed with 0.4 g/hr of the olefin polymerization catalyst component described above which was subjected to the pre-activation treatment and triethylaluminum and diisopropyldimethoxysilane in such amounts that an Al/Mg molar ratio was controlled to 6 and an Al/Si molar ratio was controlled to 6 in terms of a molar ratio. Propylene gas was continuously fed while maintaining the conditions of a reaction temperature of 65° C., a reaction pressure of 2.0 MPa and a stirring speed of 35 rpm, and hydrogen gas was continuously fed from a circulating pipeline 2 so that a hydrogen concentration in a gas phase of the polymerizing device was maintained at a hydrogen/propylene molar ratio shown in Table 1 to control an intrinsic viscosity of the propylene polymer (A).

The reaction heat was removed by vaporization heat of raw material liquefied propylene fed from a pipeline 3. Unreacted gas discharged from the polymerizing device was cooled and condensed outside the reactor system through a pipeline 4 and circulated into the polymerizing device 1.

The propylene polymer (A) obtained in the present polymerization was continuously drawn out from the polymerizing device 1 through a pipeline 5 so that a holding level of the polymer was controlled to 50 volume % of the reactor volume and fed into a polymerizing device 10 in the second polymerization step. In this case, a part of the propylene polymer (A) was intermittently drawn out from the pipeline 5 to obtain a sample for determining the intrinsic viscosity and the polymer yield per a catalyst unit weight The polymer yield per a catalyst unit weight was calculated from a measured value of an Mg content in the polymer by an inductively coupled emission spectrometry (ICP method).

5) Second Polymerization Step

A horizontal type polymerizing device (L/D=6, content volume: 100 liters) equipped with stirring blades was continuously fed with the propylene polymer (A) coming out from the first polymerization step and an ethylene/propylene/butene mixed gas to copolymerize propylene with ethylene and butene. The reaction conditions were a stirring speed of 25 rpm, a temperature of 60° C. and a pressure of 1.9 MPa, and a gas composition of the gas phase was controlled to an ethylene/propylene molar ratio, a butene/propylene molar ratio and a hydrogen/ethylene molar ratio each shown in Table 1. Fed respectively from a pipeline 7 were carbon monoxide as a polymerization activity inhibitor for controlling a polymerizing amount of the ethylene/propylene/butene random copolymer (B) and hydrogen gas for controlling a molecular weight of the ethylene/propylene/butene random copolymer (B).

The reaction heat was removed by vaporization heat of raw material liquefied propylene fed from a pipeline 6. Unreacted gas discharged from the polymerizing device was cooled and condensed outside the reactor system through a pipeline 8 and circulated into the second polymerization step. The polypropylene resin composition produced in the second polymerization step was continuously drawn out from the polymerizing device 10 through a pipeline 9 so that a holding level of the polymer was controlled to 50 volume % of the reactor volume.

A production rate of the polypropylene resin composition was 8 to 15 kg/hr.

The unreacted monomers were removed from the polypropylene resin composition drawn out, and a part thereof was used for determining the intrinsic viscosity $\eta_{WHOLE}$, the ethylene polymer unit content and the butene polymer unit content by IR absorption spectral analysis and a polymerization proportion of the copolymer components by measuring an Mg content in the polymer by the ICP method.

The polymerization results of the polypropylene resin compositions of PP-1 to PP-4 and the polypropylene homopolymer of PP-5 thus obtained are shown in Table 1.

TABLE 1

| Composition | Unit | Example | | Composition Example | | |
|---|---|---|---|---|---|---|
| | | 1 PP-1 | 2 PP-2 | 1 PP-3 | 2 PP-4 | 3 PP-5 |
| Pre-activation Treatment | | | | | | |
| Al/Ti/Si (molar ratio) | — | 2/1/0.3 | → | → | → | → |
| α-olefin used | | | | Propylene | | |
| Reaction amount | g-olefin/g-catalyst | 1.9 | → | → | → | → |
| First polymerization step | | | | | | |
| Al/Si (molar ratio) | — | 6 | → | → | → | → |
| Polymerization pressure | MPa | 2.0 | → | → | → | → |
| Polymerization temperature | °C. | 65 | → | → | → | → |
| Hydrogen/propylene (molar ratio) | — | 0.004 | 0.004 | 0.001 | 0.004 | 0.01 |
| Ethylene/propylene (molar ratio) | — | — | — | — | 0.007 | — |
| Polymer A | | | | | | |
| Production amount $W_A$ | weight % | 64 | 66 | 66 | 64 | 75 |
| Ethylene content | weight % | 0 | 0 | 0 | 0.8 | 0 |
| Intrinsic viscosity $\eta_A$ | dl/g | 2.71 | 2.72 | 3.32 | 2.70 | 2.25 |
| Second polymerization step | | | | | | |
| Polymerization pressure | MPa | 1.9 | → | → | → | → |
| Polymerization temperature | °C. | 60 | → | 55 | → | 65 |
| Hydrogen/ethylene (molar ratio) | — | 0.60 | 0.65 | 0.29 | 0.45 | — |
| Ethylene/propylene (molar ratio) | — | 0.20 | 0.20 | 0.40 | 0.18 | — |
| Butene/propylene (molar ratio) | — | 0.06 | 0.10 | — | — | — |
| Hydrogen/propylene (molar ratio) | — | — | — | — | — | 0.01 |
| Copolymer B | | | | | | |
| Production amount $W_B$ | weight % | 36 | 34 | 34 | 36 | 25 |
| Ethylene content | weight % | 20 | 20 | 36 | 21 | 0 |
| Butene content | weight % | 5 | 7 | 0 | 0 | 0 |
| Intrinsic viscosity $\eta_B$ | dl/g | 1.68 | 1.51 | 2.32 | 1.81 | 2.29 |
| Polypropylene resin composition | | | | | | |
| Intrinsic viscosity $\eta_{WHOLE}$ | dl/g | 2.34 | 2.31 | 2.98 | 2.38 | 2.26 |
| Intrinsic viscosity ratio $\eta_B/\eta_A$ | — | 0.62 | 0.56 | 0.70 | 0.67 | 1.02 |

Gas Permeable Film

1) Various Physical Property Measuring Methods a) Transparency: haze value (unit: %)

Measured based on a method described in ASTM D 1003. The smaller the value, the better the transparency.

b) See throughness (unit: %)

A sample in which ten films having a thickness of 20 μm were superposed in a closely contacted state was measured at a measuring wavelength of 200 to 800 nm and a scanning speed of 300 nm/minute by means of a spectrophotometer (U-3210, manufactured by Hitachi Ltd.), and the light transmittance in a visible light wavelength region (360, 570 and 780 nm) was read from the chart obtained and set as an index for the see throughness. The higher the value, the better the result, and the smaller the difference ($T_{780}$–$T_{360}$) between the light transmittance in a long wavelength side and the light transmittance in a short wavelength side, the more excellent the see throughness.

c) Gloss: brightness (unit: %)

Measured based on a method described in ASTM D 523. The higher the value, the more excellent the gloss.

d) Rigidity: Young's modulus (unit: MPa)

Measured based on a method described in ASTM D 822. The larger the value, the higher the rigidity.

e) Permeability of water vapor: $T_{H2O}$ (unit: g/m²·24 h)

Measured based on JIS Z-0208. Measured under the conditions of a temperature of 40° C. and a humidity of 90% RH, and it is shown that the higher the value, the higher the permeability of water vapor.

f) Permeability of oxygen: $T_{O2}$ (unit: nmol/m²·s·100 kPa)

Measured based on JIS K-7126A. It is shown that the higher the value, the higher the permeability of oxygen.

g) Permeability of ethylene gas: $T_{ethylene}$ (unit: nmol/m²·s·100 kPa)

Measured based on JIS K-7126A. It is shown that the higher the value, the higher the permeability of ethylene gas.

2) Production Film

Blended with each 100 parts by weight of the polypropylene resin compositions of PP-1 to PP-4 and the polypropylene homopolymer of PP-5 were 0.15 part by weight of tetrakis-[methylene-3-(3',5'-di-t-butyl-4'-hydroxyphenyl)propionate]methane as an antioxidant and 0.10 part by weight of calcium stearate as a neutralizing agent, and they were evenly mixed by means of a Henschel mixer. The mixture thus obtained was molten, kneaded and then pelletized by means of an extruding machine.

Production of Single Layer Film

Each pelletized mixture obtained above was fed into an extruding machine having an aperture of 65 mm and extruded from a T die of 250° C., and it was cooled on a cooling roll of 30° C. to obtain a sheet of 0.8 mm.

Next, the above sheet was biaxially oriented in sequence by means of a pantagraph type biaxial orienting tester to obtain a single layer biaxially oriented film. In sequential biaxial orientation, the sheets obtained from the mixtures of PP-1 to PP-4 were first pre-heated at a temperature of 154 to 158° C. for 100 to 140 seconds and then serially oriented by 4.2 times in a machine direction and by 8.2 times in a transversely direction at an orienting speed of 3 m/min, and the sheet obtained from the mixture of PP-5 was pre-heated at 158° C. for 140 seconds and then serially oriented by 4.2 times in a machine direction and by 8.2 times in a transversely direction at an orienting speed of 5 m/min.

Prescribed test pieces were prepared from the respective films thus obtained to determine transparency, see throughness, gloss, rigidity and a permeability of each gas. The results thereof are shown in Table 2.

TABLE 2

Single layer film

| Composition | Unit | Example 1 PP-1 | Example 2 PP-2 | Comparative Example 1 PP-3 | Comparative Example 2 PP-4 | Comparative Example 3 PP-5 |
|---|---|---|---|---|---|---|
| Thickness | μm | 20 | 20 | 20 | 20 | 20 |
| Haze value See throughness (visible light permeability) | % | 3.5 | 2.8 | 9.8 | 7.5 | 1.2 |
| 780 nm | % | 39.8 | 40.3 | 33.7 | 34.3 | 45.5 |
| 570 nm | | 35.8 | 36.4 | 18.4 | 20.5 | 43.2 |
| 360 nm | | 23.4 | 24.3 | 5.4 | 7.5 | 38.5 |
| $T_{780}-T_{360}$ | | 16.4 | 16.0 | 28.3 | 26.8 | 7.0 |
| Gloss | % | 105 | 115 | 50 | 55 | 140 |
| Young's modulus MD | MPa | 900 | 900 | 900 | 650 | 1800 |
| Water vapor permeability $T_{H2O}$ | $g/m^2 \cdot 24$ h | 29.0 | 29.5 | 29.0 | 30.0 | 7.5 |
| Oxygen permeability $T_{O2}$ | $nmol/m^2 \cdot s \cdot 100$ kPa | 4200 | 4300 | 4400 | 4500 | 1100 |
| Ethylene gas permeability $T_{ethylene}$ | | 4100 | 4200 | 4600 | 4300 | 500 |

Production of Multilayer Film

Each pelletized mixture obtained above was fed into an extruding machine for an intermediate layer of a multilayer film having an aperture of 90 mm, and the ethylene/propylene/butene random copolymer having a melting point of 125° C. was fed into an extruding machine for both surface layers of a multilayer film having an aperture of 40 mm. They were extruded from a T die of 250° C. and cooled on a cooling roll of 25° C. to obtain a sheet. Subsequently, it was oriented by 5 times in a machine direction by a roll heated at 80 to 120° C. and then oriented by 8 times in a transversely direction in an oven heated at 155 to 200° C. to obtain a two-kind three-layer serially biaxially oriented film.

Prescribed test pieces were prepared from the respective films thus obtained to determine transparency, see throughness, gloss, rigidity and a permeability of each gas based on prescribed test methods. The results thereof are shown in Table 3.

As shown in Table 2, PP-1 and PP-2 correspond to Example 1 and Example 2, and PP-3 to PP-5 correspond to Comparative Examples 1 to 3 respectively.

Further, as shown in Table 3, PP-1 and PP-2 correspond to Example 3 and Example 4, and PP-3 to PP-5 correspond to Comparative Examples 4 to 6 respectively.

TABLE 3

Multilayer film

| Composition used in core layer (B layer) | Unit | Example 3 PP-1 | Example 4 PP-2 | Comparative Example 4 PP-3 | Comparative Example 5 PP-4 | Comparative Example 6 PP-5 |
|---|---|---|---|---|---|---|
| Composition used in skin layer (A layer) | | Ethylene/propylene/butene random copolymer - melting point: 125° C. | | | | |
| Film layer structure (A layer/B layer/A layer) | | 1/18/1 | 1/18/1 | 1/18/1 | 1/18/1 | 1/18/1 |

TABLE 3-continued

Multilayer film

| Composition used in core layer (B layer) | Unit | Example 3 PP-1 | Example 4 PP-2 | Comparative Example 4 PP-3 | Comparative Example 5 PP-4 | Comparative Example 6 PP-5 |
|---|---|---|---|---|---|---|
| Thickness | μm | 20 | 20 | 20 | 20 | 20 |
| Haze value See throughness (visible light Permeability | % | 2.3 | 2.1 | 4.5 | 3.2 | 1.5 |
| 780 nm | % | 43.5 | 44.0 | 39.0 | 40.5 | 44.2 |
| 570 nm | | 39.5 | 40.8 | 30.5 | 34.0 | 41.5 |
| 360 nm | | 34.2 | 35.0 | 18.7 | 21.2 | 38.4 |
| $T_{780}-T_{360}$ | | 9.3 | 9.0 | 20.3 | 19.3 | 5.8 |
| Gloss | % | 110 | 110 | 80 | 95 | 135 |
| Young's modulus MD | MPa | 900 | 900 | 900 | 650 | 1700 |
| Water vapor permeability $T_{H2O}$ | $g/m^2 \cdot 24$ h | 28.5 | 28.0 | 27.0 | 29.0 | 8.0 |
| Oxygen permeability $T_{O2}$ | $nmol/m^2 \cdot s \cdot 100$ kPa | 4100 | 4000 | 3800 | 4200 | 1200 |
| Ethylene gas permeability $T_{ethylene}$ | | 3200 | 3100 | 3000 | 3300 | 500 |

Freshness-maintaining Evaluation of Vegetables and Fruits

Side-fused seal bags of 25×35 cm prepared by using the respective multilayer films produced above were charged with each 150 g of spinach, and closely wrapped articles which were heat-sealed in upper parts were stored at a temperature of 10° C. and humidity of 80% to observe the conservation states thereof. The results thereof are shown in Table 4. Further, in Table 4, shown together is Comparative Example 7 in which the multilayer film prepared in Comparative Example 6 was used and the bag was not heat-sealed in an upper part.

Further, lettuces were wrapped in the respective multilayer films by means of a wrapping machine an stored at a temperature of 15° C. and humidity of 70% to observe the conservation states thereof. The results thereof are shown in Table 5.

It can be found from the data shown in Tables 4 and 5 that the articles wrapped in the bags prepared by using the polypropylene films of the present invention (Examples 3 and 4) having a good gas permeability were extended in a conservation period of freshness as compared with the article wrapped in a conventional polypropylene bag (Comparative Example 6).

TABLE 4

Spinach

| | Example 3 | Example 4 | Comparative Example 4 | Comparative Example 5 | Comparative Example 6 | Comparative Example 7 |
|---|---|---|---|---|---|---|
| Composition | PP-1 | PP-2 | PP-3 | PP-4 | PP-5 | PP-5 |
| Packaging form | Closed | Closed | Closed | Closed | Closed | Opened in upper part |
| Freshness | | | | | | |
| Storing days | | | | | | |
| 1 | | | | | | |
| 2 | | | | | | ● |
| 3 | | | | | Δ | ▲ |
| 4 | | | | | X | X |
| 5 | | | | | | |
| 10 | | | | | | |

TABLE 4-continued

| | Spinach | | | | |
|---|---|---|---|---|---|
| | Example | | Comparative Example | | |
| | 3 | 4 | 4 | 5 | 6 | 7 |
| Composition | PP-1 | PP-2 | PP-3 | PP-4 | PP-5 | PP-5 |
| 11 | | | | | | |
| 13 | | X | X | X | X | |

Evaluation criteria:
: good
Δ: putrefaction odor
●: slightly dried
▲: dried and slightly deteriorated
X: deteriorated

TABLE 5

| | Lettuce | | | | |
|---|---|---|---|---|---|
| | Example | | Comparative Example | | |
| | 3 | 4 | 4 | 5 | 6 |
| Composition | PP-1 | PP-2 | PP-3 | PP-4 | PP-5 |
| Drilling processing | None | None | None | None | None |
| Freshness | | | | | |
| Storing days | | | | | |
| 3 | | | | | |
| 4 | | | | | |
| 5 | | | | | Δ |
| 7 | | | | | X |
| 10 | | Δ | Δ | Δ | Δ |
| 14 | | X | X | X | X |

Evaluation criteria:
: good
Δ: slightly deteriorated
X: deteriorate

Effects of the Invention

The gas permeable film obtained by using the polypropylene resin composition of the present invention is a polypropylene resin composition comprising 40 to 95% by weight of the propylene polymer (A) and 5 to 60% by weight of the ethylene/propylene/butene random copolymer (B) having a butene content of 3 to 40% by weight and an ethylene content of 10 to 30% by weight, and it is produced from the polypropylene resin composition in which a ratio $\eta_B/\eta_A$ of an intrinsic viscosity $\eta_B$ of the component (B) described above to an intrinsic viscosity $\eta_A$ of the component (A) described above falls in a range of 0.5 to 1.3 and in which the $\eta_B$ described above falls in a range of 0.5 to 3.0 dl/g. It is a polypropylene film having such good balance in physical properties that it is provided with an excellent gas permeability in combination with satisfactory optical characteristics while maintaining a rigidity.

A polypropylene film is oriented particularly in order to provide a strength and a straight cutting property which are required to a film used for a packaging material. Thus, in general, a polypropylene film is improved in regularity in molecular orientation by stretching, and a density of the film grows high, whereby the film is provided with the property that gases such as water vapor and oxygen are less liable to be permeated. However, the gas permeable film prepared by using the polypropylene resin composition used in the present invention is characterized by that it is less reduced in a gas permeability even if oriented, and it is excellent in a balance between physical properties such as transparency, see throughness, gloss and rigidity. Further, it is characterized by that it has a good visibility of the contents because of a good see throughness and that it has a good packaging machine aptitude because of a high rigidity. These excellent characteristics make it possible to suitably use the above film as a wrapping film for vegetables and fruits.

What is claimed is:

1. A polypropylene resin composition comprising 40 to 95% by weight of a propylene polymer (A) and 5 to 60% by weight of an ethylene/propylene/butene random copolymer (B) having a butene content of 3 to 40% by weight and an ethylene content of 10 to 30% by weight, wherein a ratio ($\eta_B/\eta_A$) of an intrinsic viscosity $\eta_B$ of the component (B) described above to an intrinsic viscosity $\eta_A$ of the component (A) described above falls in a range of 0.5 to 1.3; and the $\eta_B$ described above falls in a range of 0.5 to 3.0 dl/g.

2. A polypropylene resin composition:

a propylene polymer (A) having a weight percentage in a range of about 40% to about 95%; and an ethylene/propylene/butene random copolymer (B) having a weight percentage in a range of about 5% to about 60%, a butene content in a range of about 3% to about 40% weight percentage, and an ethylene content of about 10% to about 30% weight percentage.

wherein a ratio ($\eta_B/\eta_A$) of an instrinsic viscosity $\eta_B$ of the copolymer (B) to an intrinsic viscosity $\eta_A$ of the polymer (A) is in a range of about 0.5 to about 1,3; and the viscosity $\eta_B$ is in a range of about 0.5 about 3.0 dl/g.

* * * * *